(12) United States Patent
Venkatachalam et al.

(10) Patent No.: US 8,204,291 B2
(45) Date of Patent: Jun. 19, 2012

(54) METHOD AND SYSTEM FOR IDENTIFYING DEFECTS IN A RADIOGRAPHIC IMAGE OF A SCANNED OBJECT

(75) Inventors: Rajashekar Venkatachalam, Bangalore (IN); Manoharan Venugopal, Bangalore (IN); Megha Navalgund, Bangalore (IN); Gokul Swamy, East Lansing, MI (US)

(73) Assignee: General Electric Company, Niskayuna, NY (US)

( * ) Notice: Subject to any disclaimer, the term of this patent is extended or adjusted under 35 U.S.C. 154(b) by 1221 days.

(21) Appl. No.: 11/872,190

(22) Filed: Oct. 15, 2007

(65) Prior Publication Data

US 2009/0097729 A1 Apr. 16, 2009

(51) Int. Cl.
*G06K 9/03* (2006.01)
(52) U.S. Cl. .......................................... 382/132; 378/58
(58) Field of Classification Search .................... 378/58, 378/98.12; 382/132, 128, 130, 131
See application file for complete search history.

(56) References Cited

U.S. PATENT DOCUMENTS

| | | | | |
|---|---|---|---|---|
| 5,463,667 A | * | 10/1995 | Ichinose et al. | 378/58 |
| 5,524,132 A | * | 6/1996 | Ranadive | 378/58 |
| 5,617,461 A | * | 4/1997 | Schreiner | 378/98.5 |
| 5,768,406 A | * | 6/1998 | Abdel-Mottaleb | 382/132 |
| 6,336,082 B1 | * | 1/2002 | Nguyen et al. | 702/179 |
| 6,895,073 B2 | * | 5/2005 | Shih et al. | 378/58 |
| 6,990,239 B1 | * | 1/2006 | Nelson | 382/224 |
| 6,999,624 B1 | * | 2/2006 | Nelson | 382/224 |
| 6,999,625 B1 | * | 2/2006 | Nelson | 382/224 |
| 7,212,607 B1 | * | 5/2007 | Rao et al. | 378/58 |
| 7,245,693 B2 | * | 7/2007 | Buck et al. | 378/21 |
| 7,362,916 B2 | * | 4/2008 | Yamazaki | 382/275 |
| 7,522,700 B2 | * | 4/2009 | Bavendiek et al. | 378/58 |

OTHER PUBLICATIONS

Jixie Gongcheng Xuebao; Research on Automatic Inspection Technique of Real-Time Radiography for Turbine-Blade; Chinese Journal of Mechanical Engineering; vol. 41, No. 4, pp. 180-184, 2005.

* cited by examiner

*Primary Examiner* — Allen C. Ho
(74) *Attorney, Agent, or Firm* — Richard A. DeCristofaro

(57) ABSTRACT

A method for processing a radiographic image of a scanned object is provided. The method comprises acquiring radiographic image data corresponding to a scanned object and identifying one or more regions of interest in the radiographic image data corresponding to the scanned object. The method further comprises performing an image-contrast comparison of the radiographic image data corresponding to the scanned object and one or more reference radiographic images, to identify one or more defects in the radiographic image data corresponding to the scanned object.

20 Claims, 3 Drawing Sheets

Figure 1:
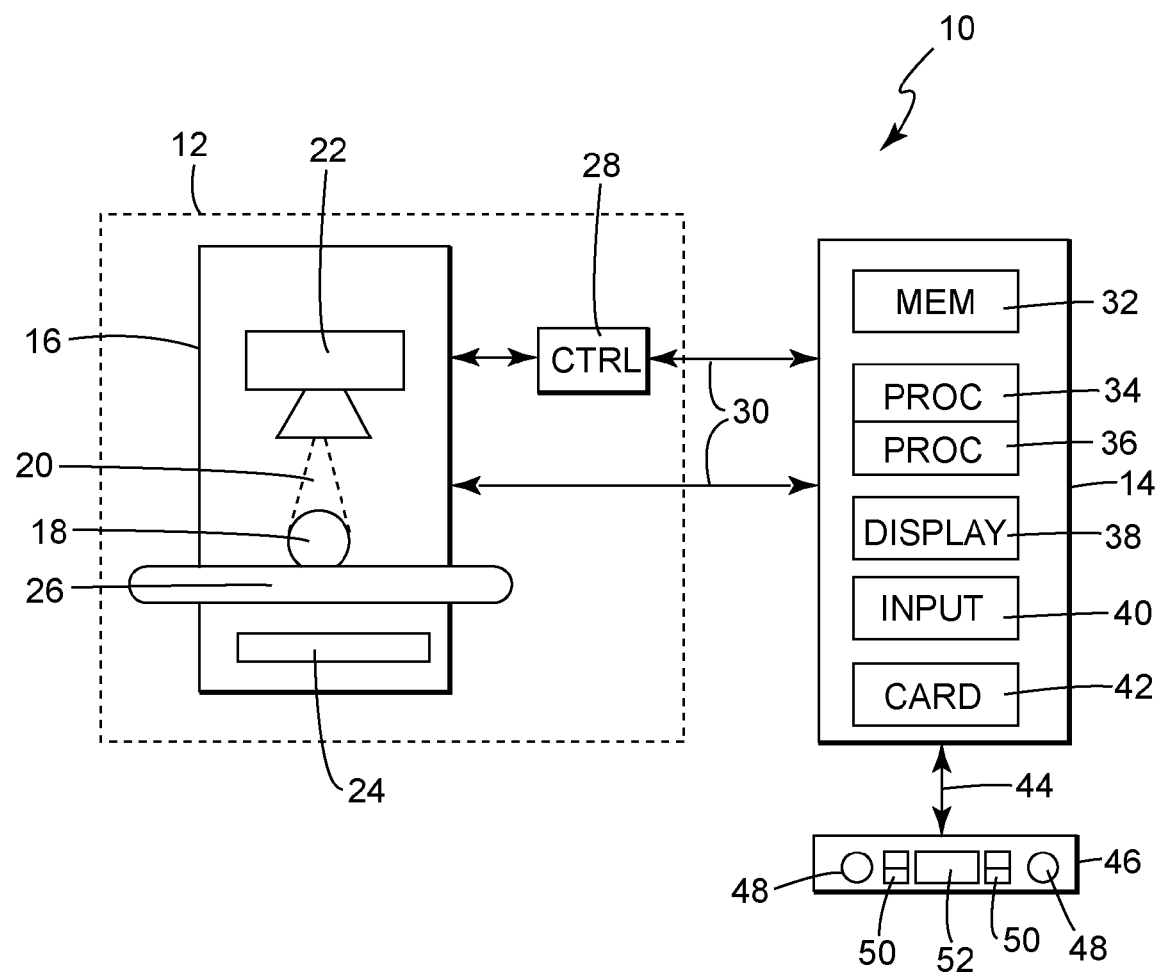

METHOD AND SYSTEM FOR IDENTIFYING DEFECTS IN A RADIOGRAPHIC IMAGE OF A SCANNED OBJECT

BACKGROUND

The invention relates generally to radiography and more particularly to a method and system for automatically identifying defects from a radiographic image of a scanned object.

Radiography is a technique of producing an image of any opaque object by the penetration of radiation, such as gamma rays, X-rays, neutrons, or charged particles. When a beam of radiation is transmitted through any object, the radiation is differentially absorbed depending upon variations in object thickness, density, and chemical composition. The energy emergent from the object forms a radiographic image, which may then be realized on an image detection medium, such as a radiation sensitive detector. The detector comprises an array of elements that records the number of incident photons at each element position, and maps the recording onto a two-dimensional (2D) image. The 2D image is then fed to a computer workstation and interpreted by trained personnel.

Radiography finds wide application in various medical and industrial applications as a non-destructive technique for examining the internal structure of an object. For example, in aerospace and automotive industries, radiographic images of aluminum castings are typically inspected by an operator who identifies defects pertaining to porosities, inclusions, shrinkages, cracks, etc. in the castings. However, and as will be appreciated by those skilled in the art, owing to the structural complexity and large production volumes of these castings, the manual inspection procedure is often prone to operator fatigue and hence suffers from low inspection reliability.

A number of radiographic inspection techniques such as feature-based classification, artificial neural networks and adaptive filtering have been developed to perform radiographic inspections of scanned objects. Feature-based classification techniques evaluate a set of features to identify potential flaws in scanned object parts based on flaw morphology and gray level statistics. These techniques assign each pixel in the image into one of several classes based on minimizing a distance metric, wherein the parameters characterizing the distance metric are evaluated using a supervised learning scheme. However, the performance of these techniques is affected by variations caused by object structure or flaw morphology and these techniques generally require large training sets with labeled flaws to perform defect identification.

It would be desirable to develop a radiographic inspection technique that automatically identifies defects from radiographic images of scanned objects. In addition, it would be desirable to develop an efficient radiographic inspection technique that produces accurate defect detectability rates, efficiently utilizes system operation setup time and system training time and is robust to changes in object part geometry and misalignment of scanned object parts.

BRIEF DESCRIPTION

Embodiments of the present invention address this and other needs. In one embodiment, a method for processing a radiographic image of a scanned object is provided. The method comprises acquiring radiographic image data corresponding to a scanned object to be tested and identifying one or more regions of interest in the radiographic image data corresponding to the scanned object. The method further comprises performing an image-contrast comparison of the radiographic image data corresponding to the scanned object and one or more reference radiographic images to identify one or more defects in the radiographic image data corresponding to the scanned object.

In another embodiment, a radiographic inspection system is provided. The system comprises an imaging system configured to acquire radiographic image data corresponding to a scanned object to be tested. The system further comprises a computer system configured to be in signal communication with the imaging system. The computer system comprises a memory, a processor and a display device. The memory is configured to store the radiographic image data corresponding to the scanned object and one or more radiographic reference images corresponding to one or more reference objects. The processor is configured to process the radiographic image data and the radiographic reference images. In one embodiment, the processor is further configured to identify one or more regions of interest in the radiographic image data corresponding to the scanned object and perform an image-contrast comparison of the radiographic image data corresponding to the scanned object and the reference radiographic images to identify one or more defects in the radiographic image data corresponding to the scanned object. The display device is configured to display the defects in the radiographic image data corresponding to the scanned object.

DRAWINGS

Figure 2:
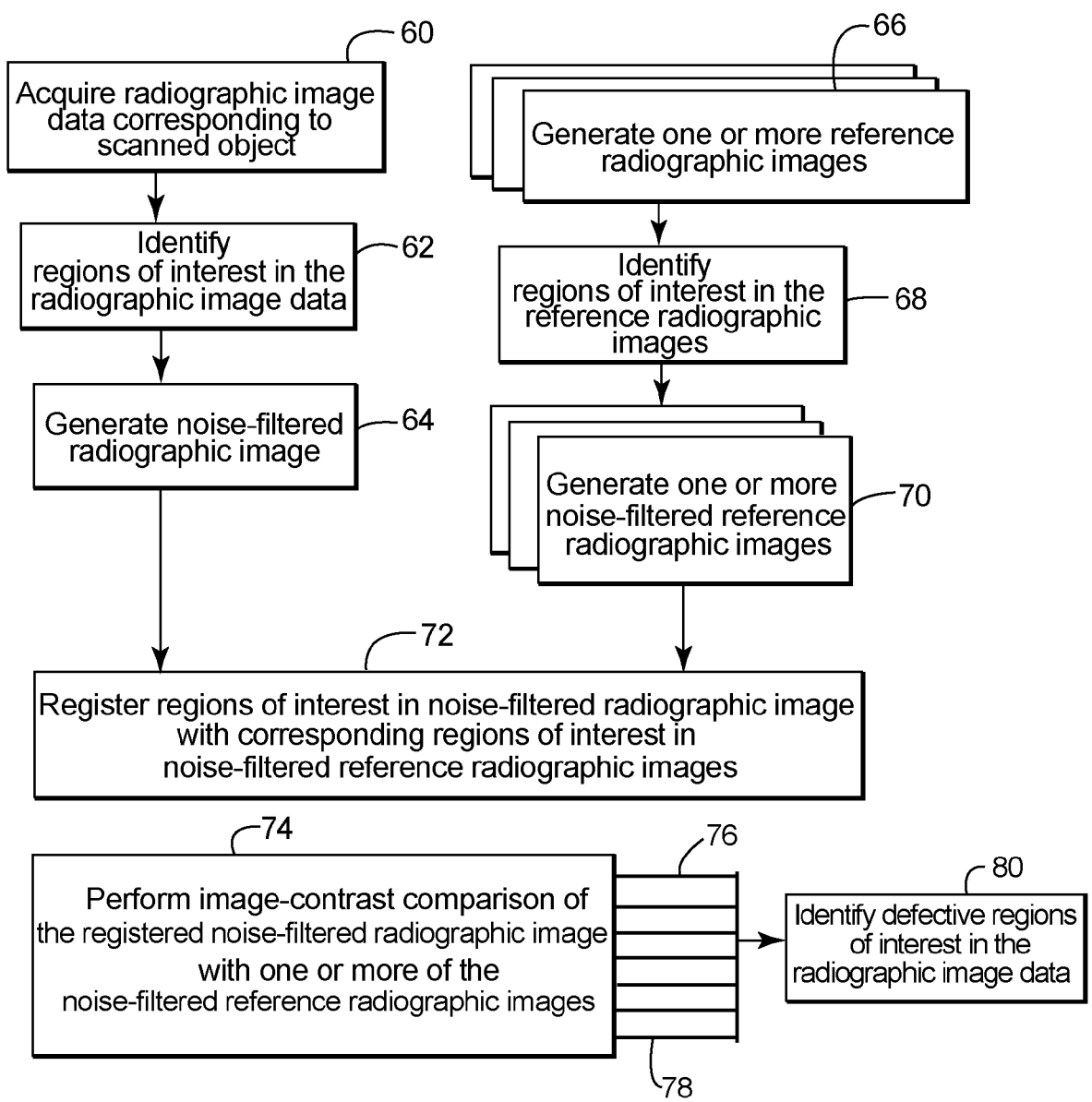
Figure 3:
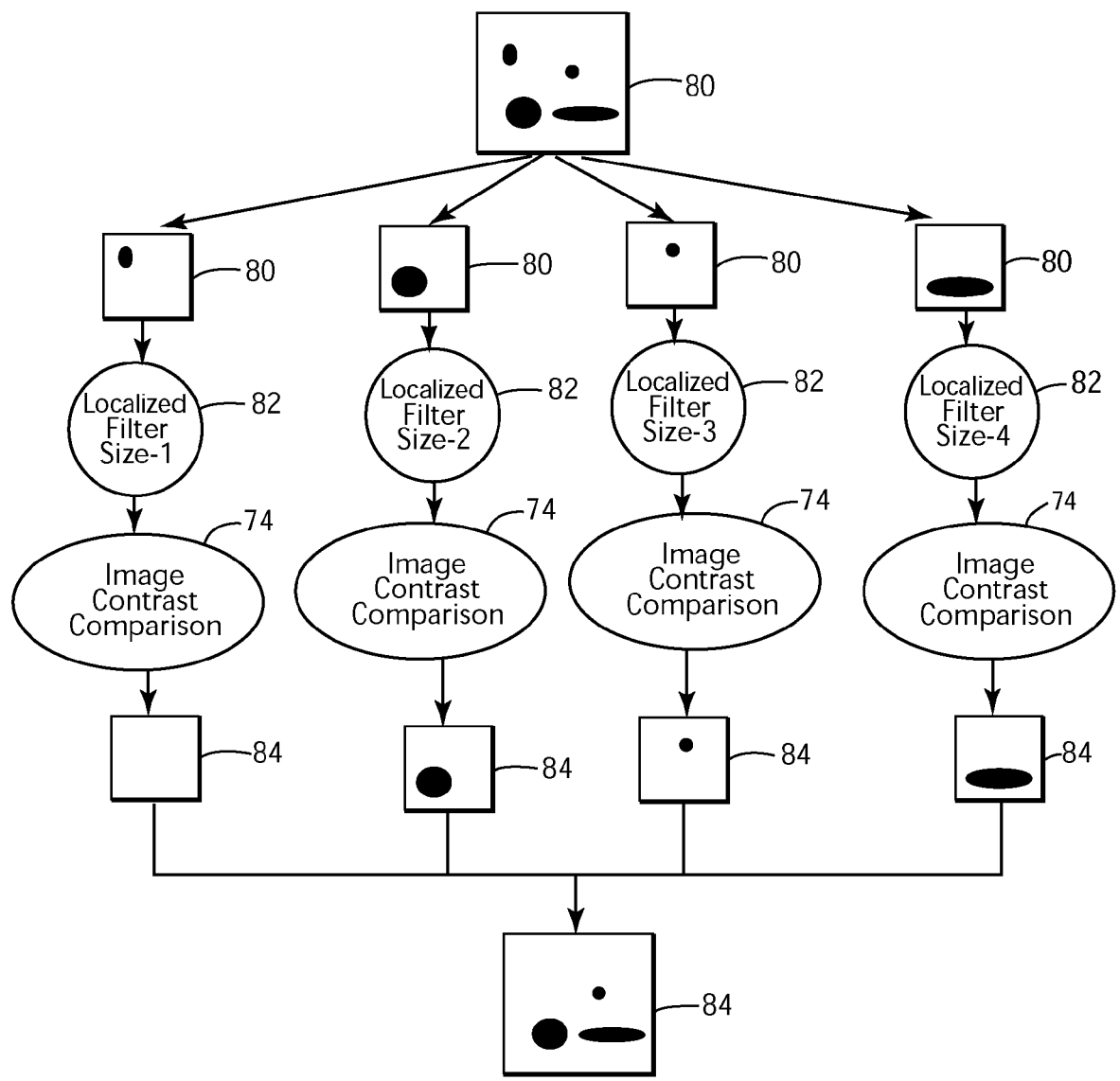

These and other features, aspects, and advantages of the present invention will become better understood when the following detailed description is read with reference to the accompanying drawings in which like characters represent like parts throughout the drawings, wherein:

FIG. 1 is an illustration of an exemplary radiographic inspection system for processing a radiographic image of a scanned object;

FIG. 2 illustrates one or more process steps that may be used by the radiographic inspection system of FIG. 1, to identify one or more defective regions of interest in the radiographic image data corresponding to a scanned object, in accordance with one embodiment of the present invention; and FIG. 3 is a process flow diagram of a multi-resolution filtering technique for identifying one or more defects in the radiographic image data corresponding to a scanned object, in accordance with one embodiment of the present invention.

DETAILED DESCRIPTION

FIG. 1 is an illustration of an exemplary radiographic inspection system for processing a radiographic image of a scanned object. Referring to FIG. 1, the radiographic inspection system 10 includes a computer system 14 adapted to be in signal communication with an imaging system 12 via a communication bus 30. A real-time image controller 46 is adapted to be in signal communication with the computer system 14 via another communication bus 44. The imaging system 12 is configured to acquire and output radiographic image data corresponding to a scanned object 18 via an imaging device 16. The imaging device 16 includes an X-ray source 22, an image detector 24 and an object manipulator 26. The imaging system 12 also includes an imaging system controller 28 that receives control commands from the computer system 14 and sends control signals to the various components of the imaging device 16. The object manipulator 26 may be a conveyor belt, a reversible table, or any other suitable device for manipulating the scanned object 18 into and out of the X-ray beam 20.

The computer system 14 includes a memory 32 configured to store the radiographic image data corresponding to the scanned object. The memory 32 may also be configured to store one or more reference radiographic images. In one embodiment, the reference radiographic images correspond to the images acquired by scanning one or more defect-free reference objects. Further, the memory 32 may include, but is not limited to, any type and number of memory chip, magnetic storage disks, optical storage disks, mass storage devices, or any other storage device suitable for retaining information. The computer system further includes one or more processors 34, 36 configured to process the radiographic image data and the reference radiographic images. In one embodiment, and as will be described in greater detail below, the processor is configured to identify one or more regions of interest in the radiographic image data corresponding to the scanned object and perform an image-contrast comparison of the radiographic image data corresponding to the scanned object and the one or more reference radiographic images to identify one or more defects in the radiographic image data corresponding to the scanned object.

Referring to FIG. 1 again, the computer system 14 also includes a detector interface card 42, an input device 40 and a display device 38. The input device 40 may include, but is not limited to, a keyboard, a mouse, a pointing device, a touch sensitive screen device, a tablet, a read/write drive for a magnetic disk, a read/write drive for an optical disk, a read/write drive for any other input medium, an input port for a communication link (electrical or optical), a wireless receiver. The display device 38 may be a CRT (cathode ray tube) screen or any other suitable display device for displaying text, graphics and a graphical user interface, for example. In one embodiment, the display device is configured to display one or more defects in the radiographic image corresponding to the scanned object. The input device 40 and the display device 38 operate in combination to provide a graphical user interface, which enables a user or operator to configure and operate the radiographic inspection system 10. The detector interface card 42 provides low-level control over the image detector, buffers data read out from the image detector 24, and optionally reorders image pixels to convert from read-out order to display order. The real-time image controller 46 includes a set of image control buttons 50, a set of image control dials 48, a display 52, and an embedded application programming interface that maps the functions of the control buttons and dials 48, 50 to the computer system 14.

FIG. 2 illustrates one or more process steps that may be used by the radiographic inspection system of FIG. 1, to identify one or more defective regions of interest in the radiographic image data corresponding to a scanned object, in accordance with one embodiment of the present invention. In one embodiment, the scanned object is a cast aluminum component and the disclosed process identifies defects such as porosities, inclusions, shrinkages and cracks from the radiographic image data corresponding to the cast aluminum component. However, it should be appreciated that the disclosed process may also be used to identify defects in various other types of structural equipment such as, for example, turbine blades and other cast metal equipment parts.

Referring to FIG. 2, in step 60, radiographic image data corresponding to a scanned object to be tested, is acquired using the radiographic inspection system 10. In step 62, one or more regions of interest in the radiographic image data corresponding to the scanned object, are identified. In one embodiment, the regions of interest include regions of "high variance" in the radiographic image data. The high-variance regions may include, but are not limited to: noise; defects; edges; and part structures comprising the radiographic image corresponding to the scanned object.

The resulting image generated in step 62 corresponds to a filtered radiographic image comprising one or more of the regions of interest, corresponding to at least one of edges, noise, defects and part structures. In a particular implementation, the image-processing filter is configured to remove/extract the high-variance regions in the radiographic image, resulting in the generation of a radiographic image with reduced variance. This image is subtracted from the original radiographic image data to generate the filtered radiographic image comprising one or more of the regions of interest, corresponding to at least one of edges, noise, defects and part structures.

In step 64, a noise-filtered radiographic image corresponding to the scanned object is generated, based on the filtered radiographic image. In one embodiment, the noise-filtered radiographic image is generated by identifying and filtering one or more regions of interest in the filtered radiographic image that are representative of image noise in the radiographic image data. Furthermore, in a particular embodiment, the noise-filtered radiographic image is generated by classifying the image pixels comprising the filtered radiographic image based on a variance level associated with one or more of the image pixels. For example, the contrast level/variance exhibited by image pixels in a region of interest representing a defect in the radiographic image data may be higher than the contrast level/variance exhibited by image pixels in a region of interest represented by just noise in the radiographic image data.

In a particular embodiment, the regions of interest that are representative of image noise in the radiographic image data are identified based on determining the variance level of the noise in the image acquired through the radiographic process. In radiography, noise is Poisson distributed, and may be represented by equation (1) below, where $\mu$ is the mean pixel intensity and $\sigma$ is the standard deviation. In other words, the standard deviation (i.e., the noise) is proportional to the square root of the mean pixel intensity, I, as given in equation (2).

$$\sigma \alpha \sqrt{\mu} \tag{1}$$

$$\text{Noise } \alpha \sqrt{I} \tag{2}$$

In accordance with embodiments of the present invention, the model developed for the image pixel noise shown in equation (1), is used to eliminate the regions of interest that are representative of image noise in the filtered radiographic image. For example, if the image pixel value is twice or thrice the square root of the mean pixel intensity, then the image pixel has a higher variance level and hence does not represent a region of interest that is representative of image noise in the filtered radiographic image.

Referring again to the process shown in FIG. 2, in step 66, one or more reference radiographic images are generated. In one embodiment, the generated reference radiographic images may be stored in the memory 34 of the computer system 14 in the radiographic inspection system 10 (shown in FIG. 1). Further, in one embodiment, the reference radiographic images are generated from one or more reference objects that represent defect free pieces of cast aluminum components.

In step 68, one or more regions of interest in the reference radiographic images are identified. In one embodiment, the regions of interest in the reference radiographic images may include, noise, edges and part structures present in the reference objects. Further, and as described in accordance with the process described in step 62 above, the regions of interest may be identified by filtering the reference radiographic images through an image-processing filter. In step 70, one or more noise-filtered reference radiographic images corresponding to the reference objects are generated, from the filtered reference radiographic images. In one embodiment, and as described with respect to the process described in step 64 above, the noise-filtered reference radiographic images are generated by classifying one or more image pixels comprising the filtered reference radiographic images based on a variance level associated with the image pixels.

In step 72, the regions of interest in the noise-filtered radiographic image are registered with corresponding regions of interest in the noise-filtered reference radiographic images. In one embodiment, the registration is performed by considering each noise-filtered reference radiographic image as a base reference image and registering the regions of interest in each noise-filtered reference radiographic image with other corresponding regions in the other noise-filtered reference radiographic images. A base reference image that gives the best registration is then chosen and the regions of interest in the noise-filtered radiographic image corresponding to the scanned object are registered with respect to this base reference image. In a particular embodiment, the registration is performed using a correlation-based approach wherein the regions of interest in the noise-filtered reference radiographic image are shifted by an incremental amount in the x and y directions, and the area of overlap between this region and the corresponding regions in the other noise-filtered reference radiographic images is recorded at this new position. The position at which a maximum overlap is recorded provides the shift magnitude and direction by which the region needs to be translated. To address non-linear misalignments, a unique shift magnitude and direction is calculated for every region of interest and a constant shift is not applied to all the regions of interest. In this manner, for regions in the radiographic image corresponding to the scanned object that do not have corresponding regions of interest in the reference radiographic images (such as, for example, when the region includes a defect) an average shift based on the shifts determined for regions common to the reference radiographic images and scanned object image are determined, to translate the region of interest.

In step 74, an image-contrast comparison of the registered noise-filtered radiographic image (corresponding to the scanned object) and one or more of the noise filtered reference radiographic images (corresponding to the reference objects), is performed. In one embodiment, performing the image-contrast comparison comprises identifying one or more defective regions of interest in the radiographic image data corresponding to the scanned object based on a comparison of an image-contrast intensity level of one or more regions comprising the one or more noise-filtered reference radiographic images and an image-contrast intensity level of one or more regions comprising the noise-filtered radiographic image. For example, if a particular region of interest in the noise-filtered radiographic image data corresponding to the scanned object and the corresponding region of interest in the noise-filtered reference radiographic image has a substantially large image contrast difference (for example, >1.5 times the noise variance in the radiographic image), then this region may be classified as a defective region of interest. Also if a particular region of interest exists only in the radiographic image data corresponding to the scanned object then this region of interest may also be classified as a defective region.

Further, in accordance with one embodiment, a defect probability measure for the identified defective regions of interest is determined. For example, if a particular region of interest is identified as a defective region of interest in the radiographic image data corresponding to the scanned object, by all the noise-filtered reference radiographic images, then the particular region of interest has a high probability of being classified as a defective region of interest in the radiographic image data corresponding to the scanned object. In a particular implementation, seven noise-filtered reference radiographic image corresponding to seven reference radiographic images are generated. However, it should be appreciated that the number of reference radiographic images generated may vary based on the particular implementation. Referring to FIG. 2 now, reference numeral 76 represents the defective regions of interest identified by a first noise-filtered reference radiographic image 1. Similarly, reference numeral 78 represents the defective regions of interest identified by an $n^{th}$ noise-filtered reference radiographic image n. In step 80, one or more defective regions of interest in the radiographic image data are identified.

In one embodiment, one or more defect metrics may further be used to identify the defective regions of interest. The defect metrics may include, for example, curvature information used to differentiate the structural parts (such as, for example, the ratio of the major axis length and the minor axis length, $4*\Pi*Area/Perimeter^2$), proximity to strong part edges and information that distinguishes the area in a scanned object from a defect present in the scanned object. A low curvature factor indicates that the region of interest is more or less a straight line and hence an edge rather than a defect. Similarly a region which is very close to a strong part edge is analyzed based on its contrast and probability measures to ascertain that the region corresponds to a defect and is not a false call that has been identified due to misalignments. The defective regions of interest identified in accordance with the process disclosed in FIG. 2, may further be processed to identify one or more defects in the radiographic image data corresponding to the scanned object, in a manner as will be described in greater detail with respect to FIG. 3 below.

FIG. 3 is a process flow diagram of a multi-resolution filtering technique for identifying defects in the radiographic image data corresponding to a scanned object, in accordance with one embodiment of the present invention. In one embodiment, a multi-resolution filtering of one or more of the identified defective regions of interest 80 comprising the radiographic image data corresponding to the scanned object is performed. In one embodiment, the multi-resolution filtering comprises applying one or more localized image processing filters 82 over one or more of the identified defective regions of interest 80, to identify one or more defects 84 in the radiographic image data comprising the scanned object.

In a particular embodiment, the localized image processing filters 82 may include one or more median filters of a predetermined size that correspond to the area of the defective region of interest. As will be appreciated by those skilled in the art, non-defective regions of interest in the radiographic image data may sometimes get identified as defective regions, because of the presence of high contrast regions in the radiographic image data. For example, the presence of an edge in the radiographic image data may contribute to a high contrast region near a defective region of interest, causing the entire region of interest to be classified as a defective region. In accordance with embodiments of the present invention, the localized image processing filters 82 are configured to eliminate the influence of other high contrast regions that do not contribute to a defect, by suppressing these regions from being identified as defective regions in the radiographic image data. Accordingly, the localized image processing filters 82 enable the identification of true defects in the radiographic image data, thereby reducing false calls. Referring to FIG. 3 now, one or more defects 84 in the radiographic image data are further identified based on the contrast level exhibited by the defective regions of interest in the radiographic image data, within a localized region of interest as determined by one or more of the localized filters 82. Further, and as described with respect to FIG. 2 above, an image contrast comparison of the identified defective regions of interest may again be performed to identify the defects 84 in the radiographic image data corresponding to the scanned object.

The disclosed embodiments have several advantages including the ability to identify defects in radiographic image data corresponding to a scanned object with a high level of accuracy. Further, the disclosed embodiments enable the detectability of even low contrast defects present close to significant image gradients such as part structures and edges present in the radiographic image. In addition, the disclosed process of identifying defects in radiographic images is efficient, uses fewer parameters (thereby reducing system operation setup time), requires little or no manual intervention (thereby reducing system training time) and is robust to changes in object part geometry and misalignment of scanned object parts.

The foregoing embodiments show the functionality and operation of a method for identifying defects in radiographic image data corresponding to a scanned object. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added.

The above-described method comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, and then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for processing a radiographic image of a scanned object, the method comprising:
    acquiring radiographic image data corresponding to a scanned object;
    identifying one or more regions of interest in the radiographic image data corresponding to the scanned object by filtering the radiographic image data corresponding to the scanned object through an image-processing filter to identify the one or more regions of interest;
    generating a noise-filtered radiographic image corresponding to the scanned object, based on the filtered radiographic image data by classifying one or more image pixels comprising the filtered radiographic image data based on a variance level associated with one or more of the image pixels; and
    performing an image-contrast comparison of the radiographic image data corresponding to the scanned object and one or more reference radiographic images, to identify one or more defects in the radiographic image data corresponding to the scanned object.

2. The method of claim 1, wherein the scanned object comprises at least one of cast aluminum components, turbine blades and cast metal equipment parts.

3. The method of claim 1, wherein the image-processing filter is a median filter.

4. The method of claim 1, further comprising generating a filtered radiographic image comprising one or more of the regions of interest.

5. The method of claim 1, wherein the one or more regions of interest comprise at least one of noise, defects, edges and part structures comprising the radiographic image data corresponding to the scanned object.

6. The method of claim 1, wherein performing the image-contrast comparison to identify one or more defective regions of interest in the radiographic image data comprising the scanned object comprises performing a comparison of an image-contrast intensity level of one or more regions comprising one or more noise-filtered reference radiographic images and an image-contrast intensity level of one or more regions comprising the noise-filtered radiographic image.

7. The method of claim 6, further comprising performing a multi-resolution filtering of the one or more defective regions of interest comprising the radiographic image data corresponding to the scanned object.

8. The method of claim 7, wherein performing the multi-resolution filtering of the one or more defective regions of interest comprises applying one or more localized image processing filters over the one or more defective regions of interest to identify one or more defects in the radiographic image data corresponding to the scanned object.

9. A radiographic inspection system comprising:
    an imaging system configured to acquire radiographic image data corresponding to a scanned object; and
    a computer system configured to be in signal communication with the imaging system, wherein the computer system comprises:
        a memory configured to store the radiographic image data corresponding to the scanned object and one or more radiographic reference images corresponding to one or more reference objects;
        a processor configured to:
            process the radiographic image data and the one or more radiographic reference images;
            identify one or more regions of interest in the radiographic image data corresponding to the scanned object by filtering the radiographic image data corresponding to the scanned object through an image-processing filter to identify the one or more regions of interest;

generate a noise-filtered radiographic image corresponding to the scanned object, based on the filtered radiographic image data by classifying one or more image pixels comprising the filtered radiographic image data based on a variance level associated with one or more of the image pixels; and perform an image-contrast comparison of the radiographic image data corresponding to the scanned object and the one or more reference radiographic images to identify one or more defects in the radiographic image data corresponding to the scanned object; and a display device configured to display the one or more defects in the radiographic image data corresponding to the scanned object.

10. The system of claim 9, wherein the scanned object comprises at least one of cast aluminum components, turbine blades and cast metal equipment parts.

11. The system of claim 9, wherein the processor is configured to generate a filtered radiographic image comprising one or more of the one or more regions of interest.

12. The system of claim 9, wherein the one or more regions of interest comprise at least one of noise, defects, edges and part structures comprising the radiographic image data corresponding to the scanned object.

13. The system of claim 9, wherein the processor is configured to perform the image-contrast comparison to identify one or more defective regions of interest in the radiographic image data comprising the scanned object based on a comparison of an image-contrast intensity level of one or more regions comprising one or more noise-filtered reference radiographic images and an image-contrast intensity level of one or more regions comprising the noise-filtered radiographic image.

14. The system of claim 13, wherein the processor is further configured to perform a multi-resolution filtering of the one or more defective regions of interest by applying one or more localized image processing filters over the one or more defective regions of interest, to identify the one or more defects in the radiographic image data corresponding to the scanned object.

15. A method for processing a radiographic image of a scanned object, the method comprising:

acquiring radiographic image data corresponding to a scanned object;

identifying one or more regions of interest in the radiographic image data corresponding to the scanned object by filtering the radiographic image data corresponding to the scanned object through an image-processing filter to identify the one or more regions of interest;

generating a noise-filtered radiographic image corresponding to the scanned object, based on the filtered radiographic image data; and performing an image-contrast comparison of the radiographic image data corresponding to the scanned object and one or more reference radiographic images, to identify one or more defects in the radiographic image data corresponding to the scanned object by performing a comparison of an image-contrast intensity level of one or more regions comprising one or more noise-filtered reference radiographic images and an image-contrast intensity level of one or more regions comprising the noise-filtered radiographic image.

16. The method of claim 15, wherein the image-processing filter is a median filter.

17. The method of claim 15, further comprising generating a filtered radiographic image comprising one or more of the regions of interest.

18. The method of claim 15, wherein the one or more regions of interest comprise at least one of noise, defects, edges and part structures comprising the radiographic image data corresponding to the scanned object.

19. The method of claim 15, further comprising performing a multi-resolution filtering of the one or more defective regions of interest comprising the radiographic image data corresponding to the scanned object.

20. The method of claim 19, wherein performing the multi-resolution filtering of the one or more defective regions of interest comprises applying one or more localized image processing filters over the one or more defective regions of interest to identify one or more defects in the radiographic image data corresponding to the scanned object.

* * * * *